US 6,594,636 B1

(12) United States Patent
Sakaguchi et al.

(10) Patent No.: US 6,594,636 B1
(45) Date of Patent: Jul. 15, 2003

(54) METHOD FOR MANAGING WORKFLOW BASED ON ELECTRONIC MAIL SYSTEM

(75) Inventors: Toshiaki Sakaguchi, Kawasaki (JP); Shunsuke Akifuji, Wako (JP); Hiroshi Tsuji, Itami (JP); Atsushi Aoki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/357,831

(22) Filed: Jul. 21, 1999

(30) Foreign Application Priority Data

Jul. 23, 1998 (JP) .......................... 10-207750

(51) Int. Cl.[7] .............................. G06F 17/60
(52) U.S. Cl. .................. 705/7; 705/8; 705/10
(58) Field of Search .................... 705/7, 8, 10

(56) References Cited

U.S. PATENT DOCUMENTS

| 5,627,764 | A |   | 5/1997 | Shutzman et al. |
| 5,937,388 | A | * | 8/1999 | Davis et al. ................ 705/8 |
| 6,041,306 | A | * | 3/2000 | Du et al. .................... 705/8 |
| 6,154,753 | A | * | 11/2000 | McFarland ................ 705/508 |

FOREIGN PATENT DOCUMENTS

| EP | 684573 | | 11/1995 | |
| GB | 2263988 | | 8/1993 | |
| GB | 0 684 573 A3 | * | 9/1997 | ........... G06F/17/60 |
| JP | 7-336385 | | 12/1995 | |
| JP | 8-123744 | | 5/1996 | |
| JP | 10-207750 | * | 7/1999 | ........... G06F/17/60 |

OTHER PUBLICATIONS

"Substantial Ability of Power Workflow", article of "Intranet" published by Softbank–Sha, Mar. 1998, pp. 61–71.
Kappel, G. "Hypermedia Document and Workflow Management Based on Active Object–Oriented Databases", Systems and Sciences 1997; Preceeedings of the 30th Annual Conference, vol. 4, 7–10. Jan. 1997 pp 377–386.*
"Workflow Management Coalition Terminology and Glossary" Feb. 1999 pp 1–65.*

* cited by examiner

Primary Examiner—James P. Trammell
Assistant Examiner—James A. Reagan
(74) Attorney, Agent, or Firm—Mattingly, Stanger & Malur, P.C.

(57) ABSTRACT

In a workflow management system, a mail instance can be easily registered as a workflow instance and workflow definitions, and a workflow instance can be replaced at any process stage by other workflow definitions including present workflow definitions. A mail flow pattern is extracted from a mail transmission audit data storage unit, and a flow definition comparison part compares the mail flow pattern with the flow definitions stored in a workflow definition storage unit. A definition registration part and an instance registration part register the mail flow pattern information as instance information of designated workflow definitions and as new workflow definitions. In accordance with predefined workflow definitions, intersectional workflow definitions and extended workflow definitions corresponding to a mail flow are selected and displayed. The mail flow pattern is registered in the workflow definition storage unit as flow definitions based upon the flow definitions selected from among the displayed workflow definitions.

7 Claims, 15 Drawing Sheets

| DATE/TIME | FROM | To | Cc | MESSAGE ID | REFERENCE | SUBJECT |
|---|---|---|---|---|---|---|
| ⋮ | ⋮ | ⋮ | ⋮ | ⋮ | ⋮ | ⋮ |
| 98/01/20 13:00 | A | B,C | — | a98012001 | | ISSUE OF X PROPOSRAL |
| 98/01/20 15:00 | B | A | C | b98012001 | a98012001 | Re:ISSUE OF X PROPOSRAL |
| ⋮ | ⋮ | ⋮ | ⋮ | ⋮ | ⋮ | ⋮ |
| 98/01/21 10:00 | C | A | B | c98012101 | a98012001 | Re:ISSUE OF X PROPOSRAL |
| ⋮ | ⋮ | ⋮ | ⋮ | ⋮ | ⋮ | ⋮ |
| 98/01/22 09:00 | A | B | — | a98012201 | b98012001 | Re⁻2:ISSUE OF X PROPOSRAL |
| ⋮ | ⋮ | ⋮ | ⋮ | ⋮ | ⋮ | ⋮ |
| 98/01/22 10:00 | B | C | A | b98012201 | a98012201 | Re⁻3:ISSUE OF X PROPOSRAL |
| ⋮ | ⋮ | ⋮ | ⋮ | ⋮ | ⋮ | ⋮ |
| 98/01/22 13:00 | C | D | A,B | b98012201 | a98012201 | Re⁻4:ISSUE OF X PROPOSRAL |

| INSTANCE ID | DEFINITION ID | STATE | WORKFLOW RELEVANT DATA | ADDITIVE INFORMATION |
|---|---|---|---|---|
| AA0001 | 0001 | SUPERVISOR 2 | ACCEPT = YES | PLANNING DOCUMENT.doc |
| | | | | |
| | | | | |
| | | | | |

602  604  606  608  610

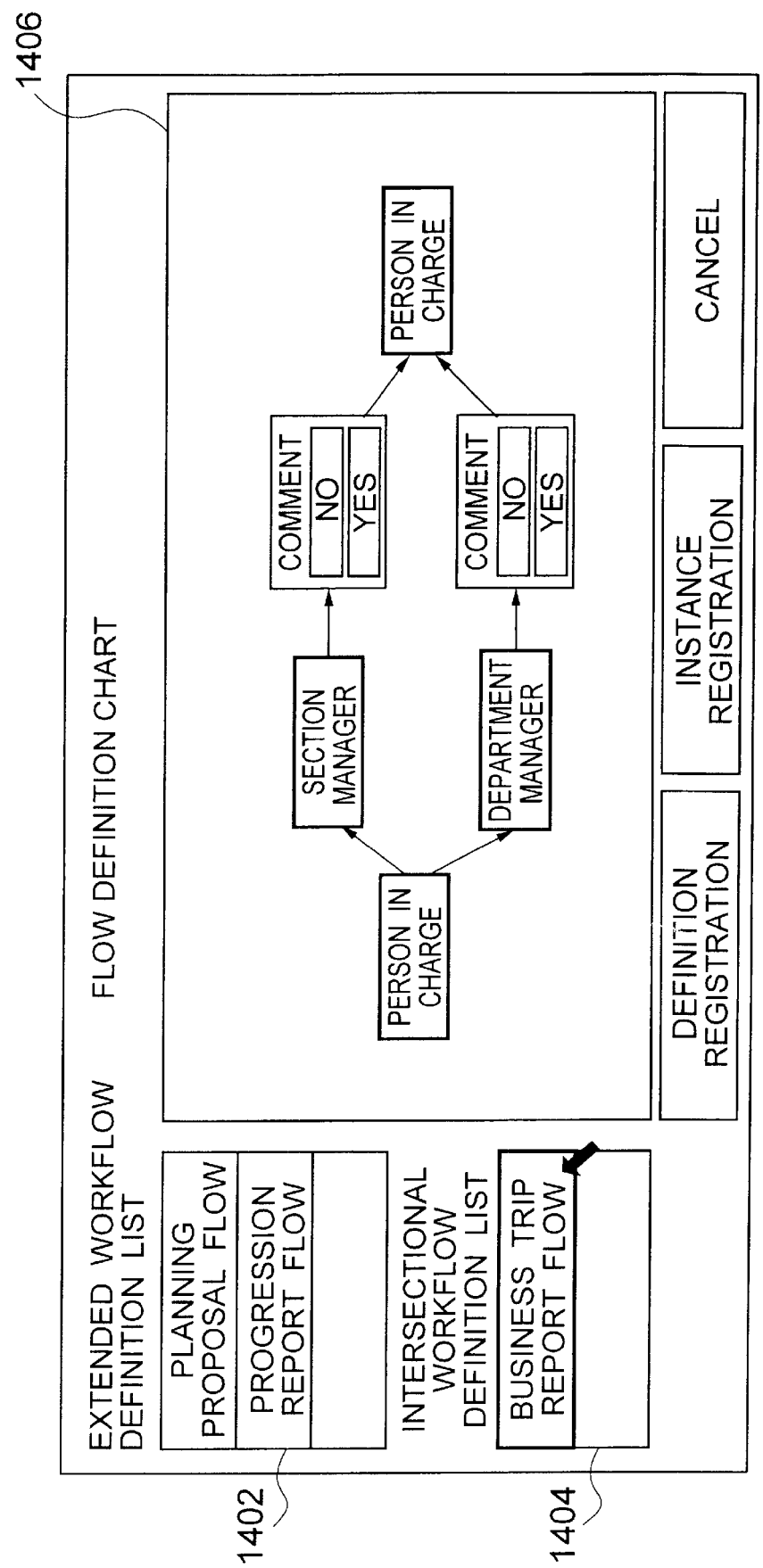

METHOD FOR MANAGING WORKFLOW BASED ON ELECTRONIC MAIL SYSTEM

BACKGROUND OF THE INVENTION

1. Field of the Invention

The present invention relates to a workflow management method for a system in which works are performed via a network interconnecting user interfaces, and more particularly to a workflow management method for a system in which a combination of a mail system and a workflow management system are operated.

2. Description of the Related Art

In a workflow system, a flow of works by paper documents is changed to a flow of works by electronic chits and books realized on a computer system to perform works of circulation, acceptance and the like. Also in this country, the workflow system is applied to electronic mails, discussion database and the like.

A known workflow is disclosed, for example, in the article "Substantial Ability of Power Workflow", at pp. 61–71 in the March 1998 issue of the "Intranet" magazine published by Softbank-Sha. According to this article, the workflow management system defines a flow of works (documents) to automatically circulate the works in accordance with the definitions to thereby shorten the work time and improve the productivity. According to the article, the workflow management system has three constituent elements: workflow definition, execution, and administration. As the workflow definition, an electronic document to be circulated and circulation destinations of the document are defined. As the workflow execution, the document is circulated in accordance with the definitions. As the workflow administration, the process state of the circulated document is recorded to monitor the work progress, and a flow of works is statistically analyzed to provide tools for improving works. A workflow is defined through programming using scripts (language), storing a circulation order in a table, using a chart, or the like.

An example of a system capable of referring to audit data of sent mails is disclosed, for example, in "Electronic Mail System" of JP-A-7-336385. According to this technique, audit data of electronic mail circulation on a plurality of networks are stored in one storage unit of the networks, and any terminal at the plurality of networks can refer to audit data of mail circulation.

An approach to managing workflow definitions is disclosed, for example, in "Workflow System" of JP-A-8-123744. According to this technique, workflow definitions are distributed to and independently managed by a plurality of sections and departments, by linking different workflow definitions via input and output ports of each group of workflow definitions.

The above-described conventional techniques are, however, associated with the following first to third problems.

First, after an electronic mail document is circulated, work progress is managed. In this case, in order to manage the works as a workflow instance, this workflow instance is required to be newly entered into a computer, resulting in a complicated operation. The electronic mail system of JP-A-7-336385 cannot generate a workflow instance by using audit data of mail circulation.

Second, it is not possible to reuse the flow of mail circulation as workflow definitions usable by other users. According to the above-cited article, process definitions corresponding to workflow definitions of this invention are generated by a process definition tool. Even if a flow of once circulated mails is again used with less modification, it is necessary to execute an operation for workflow definitions.

Third, even a circulated workflow instance cannot be reused as another workflow definition instance including a post-process, when the post-process becomes necessary for the instance. With the workflow system of JP-A-8-123744, when a user of workflow definitions is changed to another user, it is necessary to change the workflow definitions at the input and output ports, and the original workflow definitions cannot be changed at an optional position.

SUMMARY OF THE INVENTION

It is a first object of the present invention to solve the first problem and provide a workflow management method capable of easily registering a mail instance as a workflow instance.

It is a second object of the present invention to solve the second problem and provide a workflow management method capable of easily registering a mail instance as workflow definitions.

It is a third object of the present invention to solve the third problem and provide a workflow management method capable of changing a workflow instance at any intermediate process stage to other workflow definitions including current workflow definitions.

(1) In order to achieve the above objects, in a workflow management method of this invention, audit data of sent mails and mail contents are stored, a mail flow pattern is extracted from the stored audit data of sent mails, the extracted mail flow pattern is compared with preloaded flow definition information to obtain a mail extended workflow or a mail intersectional workflow as a pattern of a workflow, and this pattern is registered as new workflow definitions. Extended workflow definition means workflow definition containing therein an extracted mail flow pattern, and intersectional workflow definition means workflow definition contained in the intersectional workflow pattern.

(2) In a workflow management method for managing a flow of works by referring to flow definition information of an instance, an extended workflow or an intersectional workflow for workflow definitions of an already entered workflow instance is derived from workflow definition information preloaded in storage means, and the workflow instance is recreated as instance information of the obtained workflow definitions.

(3) In a workflow management method of this invention, a mail flow of a selected mail is displayed, intersectional workflow definitions and extended workflow definitions matching the mail flow are derived from predefined workflow definitions and displayed, one of the displayed flow definitions is selected, and the mail flow is registered as flow definitions based upon the selected flow definition.

(4) In a workflow management method of this invention, a mail flow of a selected mail is displayed, intersectional workflow definitions and extended workflow definitions matching the mail flow are derived from predefined workflow definitions and displayed, and the mail flow is registered as an instance of the selected flow definitions.

(5) In a workflow management method of this invention, a mail flow is displayed, extended workflow definitions and intersectional workflow definitions of the displayed mail flow are displayed, and a workflow instance is recreated as an instance of the extended workflow definitions for workflow definitions which are original definitions of the displayed flow definitions.

(6) In a workflow management method of the invention, relations between extended workflows and intersectional workflows for a plurality of workflow definitions are stored and managed.

BRIEF DESCRIPTION OF THE DRAWINGS

FIG. 4 is a diagram showing an example of audit data of sent mails according to the invention.

FIG. 6 is a diagram showing an example of a workflow instance according to the invention.

FIG. 14B is a diagram showing an example of a workflow definition display obtained through extraction of a mail flow according to the invention.

DETAILED DESCRIPTION OF THE EMBODIMENTS

Embodiments of the invention will be described in detail with reference to the accompanying drawings.
(1st Embodiment)

Figure 1:
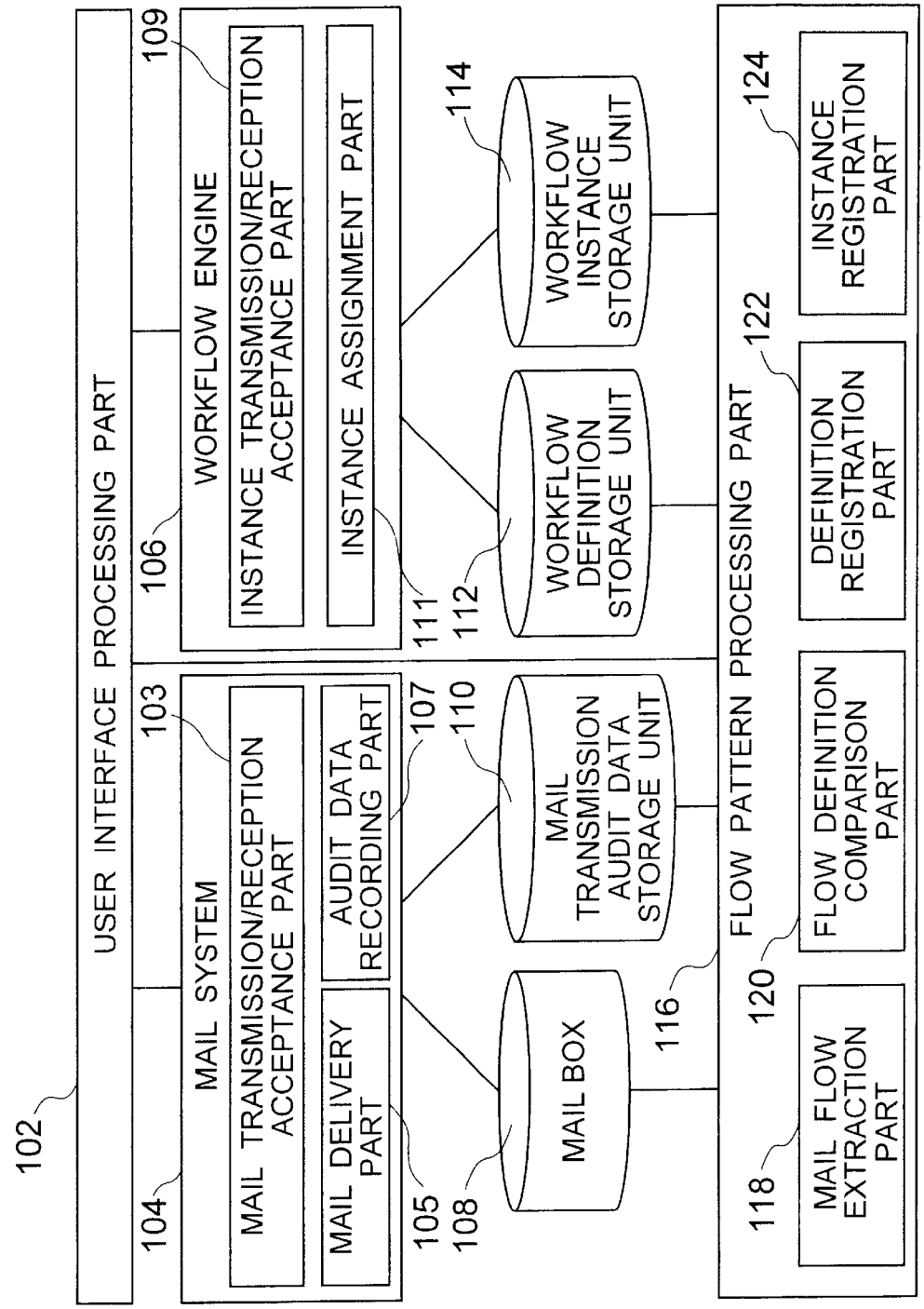
FIG. 1 is a functional block diagram illustrating a workflow management method according to a first embodiment of the invention.

FIG. 1 is a functional block diagram illustrating a workflow management method according to the first embodiment of the invention. The functions illustrated in FIG. 1 are provided by a server of a client-server system realizing a workflow system.

Of the blocks shown in FIG. 1, a mail box 108, a mail transmission audit data storage unit 110, a workflow definition storage unit 112 and a workflow instance storage unit 114 are hardware having a storage function, and the other blocks including a user interface processing part 102, a mail system 104, a workflow engine 106 and a flow pattern processing part 116 are all software which executes programs. The mail system 104 and workflow engine 106 provide known functions.

The user interface processing part 102 calls a mail transmission/reception acceptance part 103 of the mail system 104 via a connection link. If a call is a mail transmission request, the mail transmission/reception acceptance part 103 calls a mail delivery part 105 which analyzes the contents of a mail to be transmitted and stores the mail in a mail box of a user who is specified by the contents of the mail or the address of the mail in the mail box 108. After the mail is delivered by the mail delivery part 105, an audit data recording part 107 stores assignment audit data in the mail transmission audit data storage unit 110. If a call is a mail reception request, the mail transmission/reception acceptance part 103 acquires a mail corresponding to a called user from the mail box 108 and outputs it to the user interface processing part 102.

The user interface processing part 102 also calls an instance transmission/reception acceptance part 109 of the workflow engine 106 via a connection link. If a call is an instance transmission (transition) request, the instance transmission/reception acceptance part 109 calls an instance assignment part 111. The instance assignment part 111 acquires workflow definitions corresponding to an instance to be transmitted, from the workflow definition storage unit 112, determines a next assignment user to which the instance is delivered, in accordance with the workflow definition, and updates the workflow instance storage unit 114 so that the instance becomes an object to be processed by the next assignment user. If a call is an instance reception request, the instance transmission/reception acceptance part 109 acquires an instance corresponding to the called user from the workflow instance storage unit 114 and outputs it to the user interface processing part 102.

The user interface part 102 also calls the flow pattern processing unit part 115 via a directly connected link, reads information from the mail box 108, mail transmission/reception audit data storage unit 110 or workflow definition storage unit 112, and writes workflow definition information into the workflow definition storage unit 112 and a workflow instance into the workflow instance storage unit 114.

The flow-pattern processing part 116 includes a mail flow extraction part 118, a flow definition comparison part 120, a definition registration part 122 and an instance registration part 124. The invention is characterized in the provision of the flow pattern processing part 116 which is realized by programs providing the functions of these parts 118, 120, 122, and 124. The detailed flow charts illustrating the processed to be executed by the mail flow extraction part 118, flow definition comparison unit part 120, definition registration part 122 and instance registration part 124 are shown respectively in FIGS. 8, 10, 11 and 12.

Figure 3:
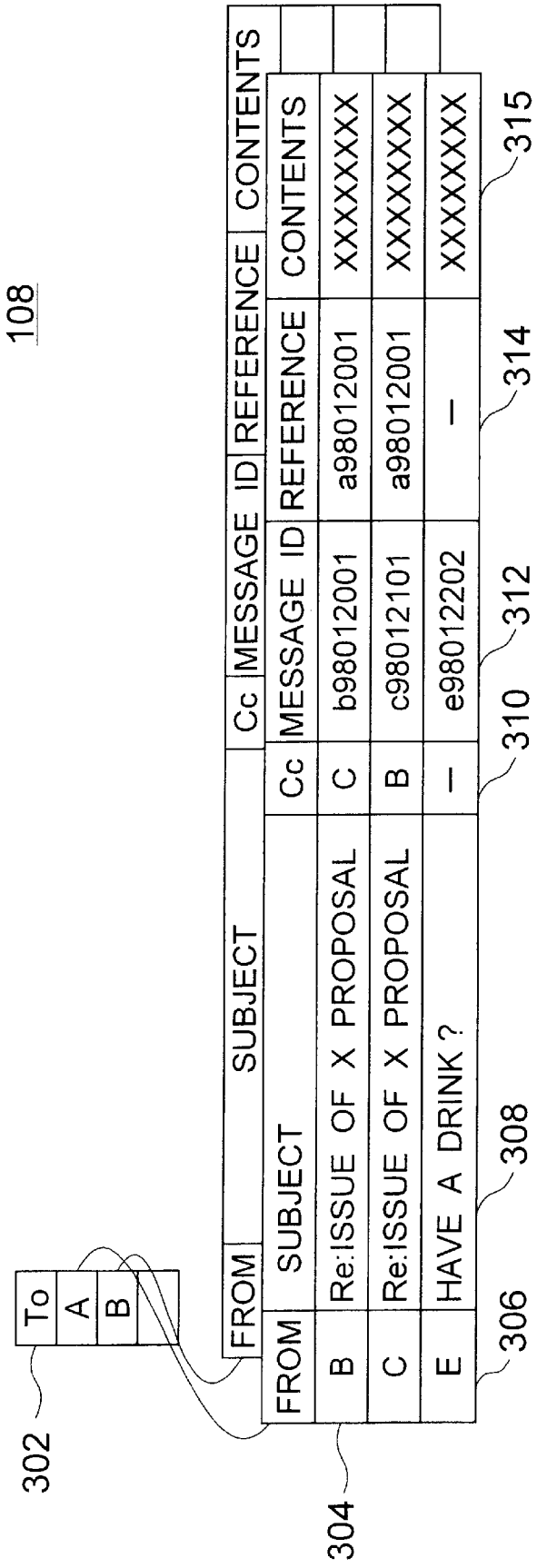
FIG. 3 is a diagram showing an example of a mail box according to the invention.

FIG. 3 shows an example of data stored in the mail box 108 shown in FIG. 1.

As shown in FIG. 3, the mail box 108 is constituted of a user list 302 and user specific mail boxes 304 assigned to respective users corresponding to fields of the list 302. In this example shown in FIG. 3, mail boxes 304 for users A and B are shown. The user specific mail box 304 is constituted of a mail sender field 306, a mail subject field 308, a carbon copy recipient field 310, a message ID field 312, a reference message (message for reference to the mail) ID field 314, and a mail content field 315. The message ID field 312 is an identifier which the mail system uniquely assigns to each mail. In this example shown in FIG. 3, the messages b98012001 and c98012101 of users B and C in the mail sender field 306, supplied to users C and B in the carbon copy recipient ID field 310, make reference to a similar message a98012001 of user A in the reference message ID field 314. In other words, this example shows a case where a mail having the message ID b98012001 and the mail sender B and referring to the message ID a98012001, and a mail having the message ID c98012101 and the mail sender C and referring to the message ID a98012001 are stored in the mail box 108.

FIG. 4 shows an example of data stored in the mail transmission audit data storage unit 110 shown in FIG. 1.

As shown in FIG. 4, the mail transmission audit data storage unit 110 is constituted of a mail transmission date/time field 402, a mail sender field 404, a mail recipient field 406, a carbon copy recipient field 408, a message ID field 410, a reference message ID field 412, and a mail subject field 414. In the example shown in FIG. 4, mail transmission audit data of three days from 98/01/20, 13:00 to 98/01/22, 13:00 is given.

Figure 5:
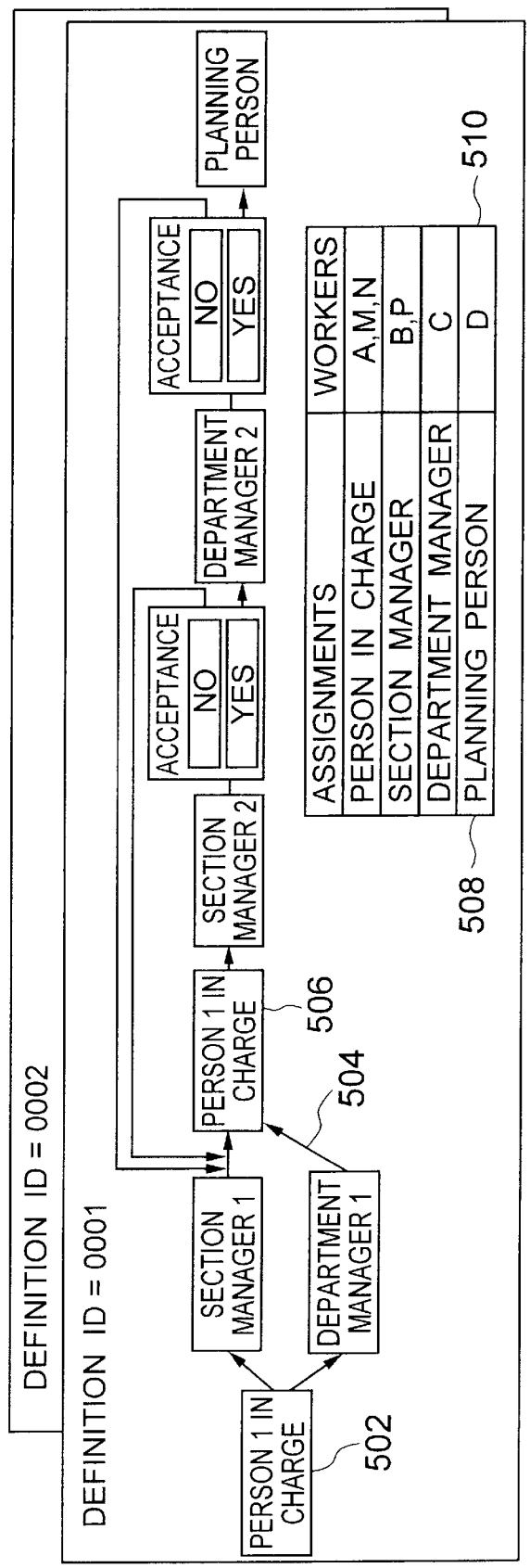
FIG. 5 is a diagram showing an example of workflow definitions.

FIG. 5 shows an example of workflow definitions stored in the workflow definition storage unit 112 shown in FIG. 1.

As shown in FIG. 5, the workflow definitions 112 are constituted of activities representative of processes such as those indicated at 502 and 506 and arrows representative of process flows such as those indicated at 504. Of the activities representative of processes, the activities 502 are work activities corresponding to users including persons in charge and supervisors, and the activities 506 are control activities whereat a split condition is made to change the process flow. In the lower right area in FIG. 5, a correspondence table is provided which shows assignments 508 at each activity and corresponding workers 510. A, M and N are persons in charge, B and P are section managers, C is a department manager, and D is a planning person. After an instance is passed from a person 1 in charge to a section manager 1 and a department manager 1, revised or accepted instances are collected at a person 2 in charge. If the instance is accepted by a section manager 2, it is passed to a department manager 2. If the department manager 2 does not accept it, the instance is returned to the person 2 in charge. If the instance is accepted by the department manager 2, it is passed to a planning person, whereas if it is not accepted, the instance is again returned to the person 2 in charge.

FIG. 6 shows an example of instance information stored in the workflow instance storage unit 114 shown in FIG. 1.

As shown in FIG. 6, instance information is constituted of an instance ID 602, a definition ID 604, a state 606, workflow relevant data 608 and additive information 610. When an instance is generated, the workflow engine 106 assigns the instance a unique ID and changes the state each time the circulation destination of the instance is changed. In accordance with the workflow relevant data and workflow definition set by workers, the workflow engine 106 determines the next circulation destination or destinations. In the example shown in FIG. 6, after AA0001 and 0001 are allocated as the instance ID 602 and definition ID 604, the instance is passed to the section manager 2 shown in FIG. 5 as indicated by the state 606 and accepted by the section manager 2 as indicated by the workflow relevant data 608, and a planning document is designated as the additive information 610.

Next, the operation of the workflow management method of this invention to be executed in response to a user operation will be described with reference to FIGS. 7, 13 and 14.

Figure 7:
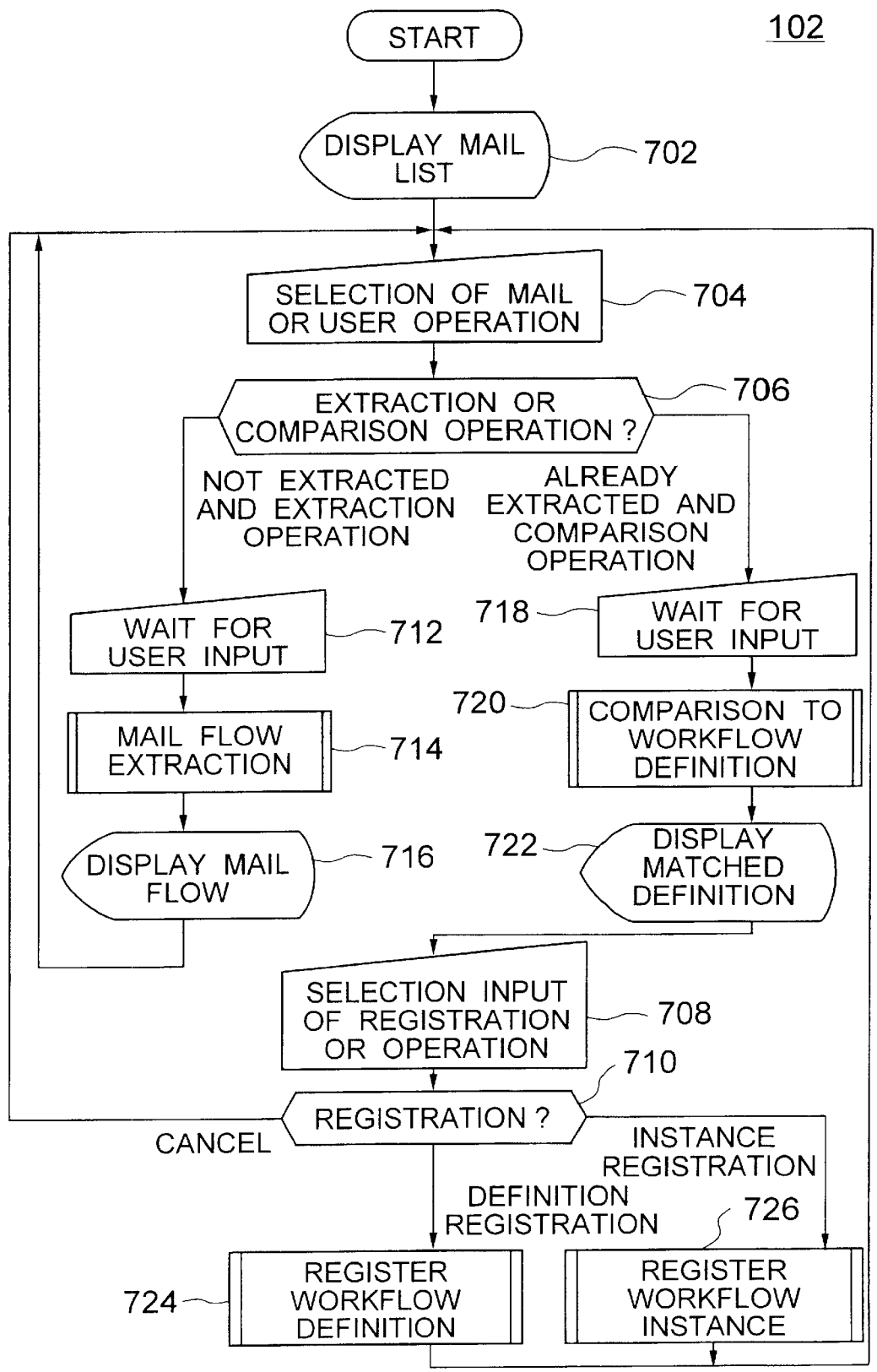
FIG. 7 is a flow chart illustrating an operation of a user interface processing part shown in FIG. 1.
Figure 11:
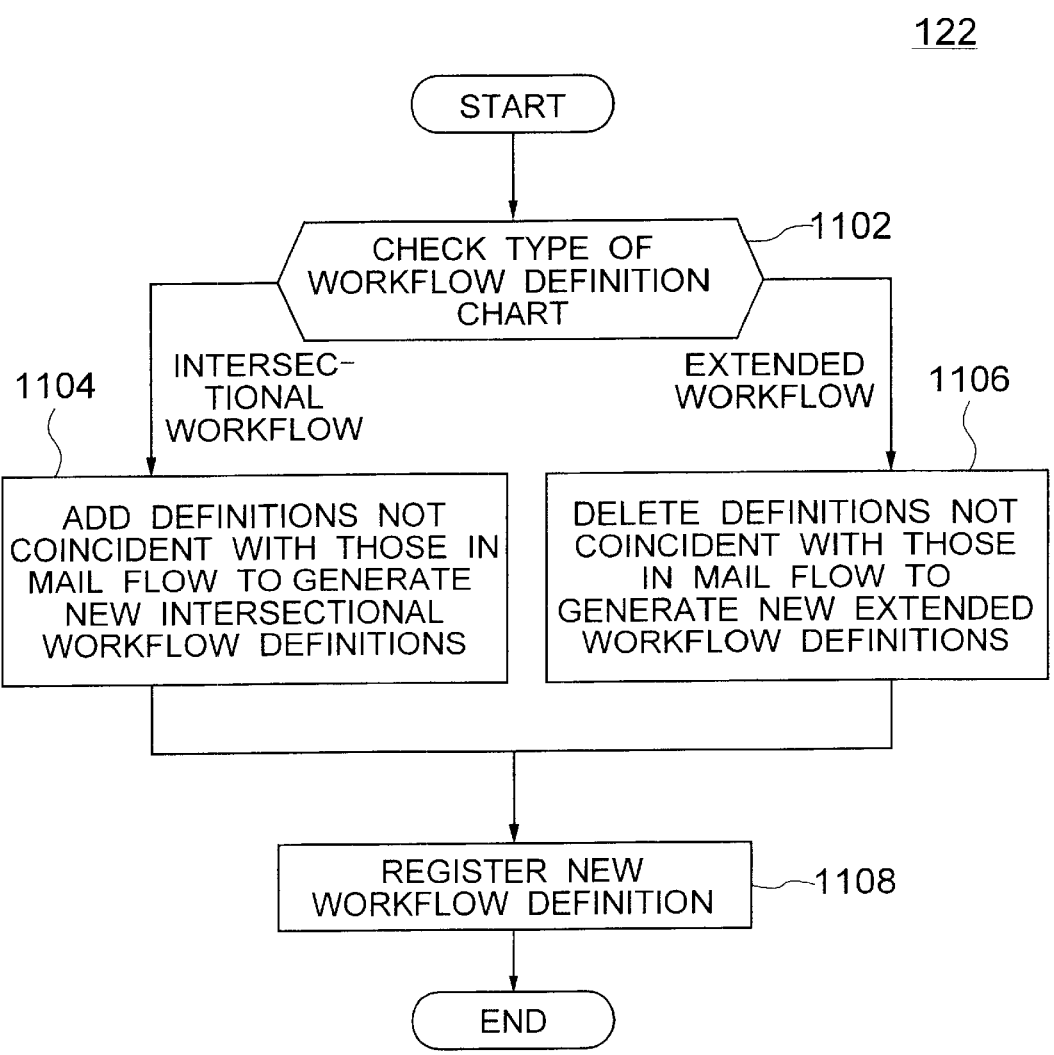
FIG. 11 is a flow chart illustrating a process of a workflow definition registration part shown in FIG. 1.

FIG. 7 is a flow chart illustrating the operation of the user interface processing part 102 shown in FIG. 11. FIG. 13 is a diagram showing an example of a mail flow display, and FIGS. 14A and 14B are diagrams showing examples of workflow definitions obtained through extension and extraction of a mail flow.

Figure 13:
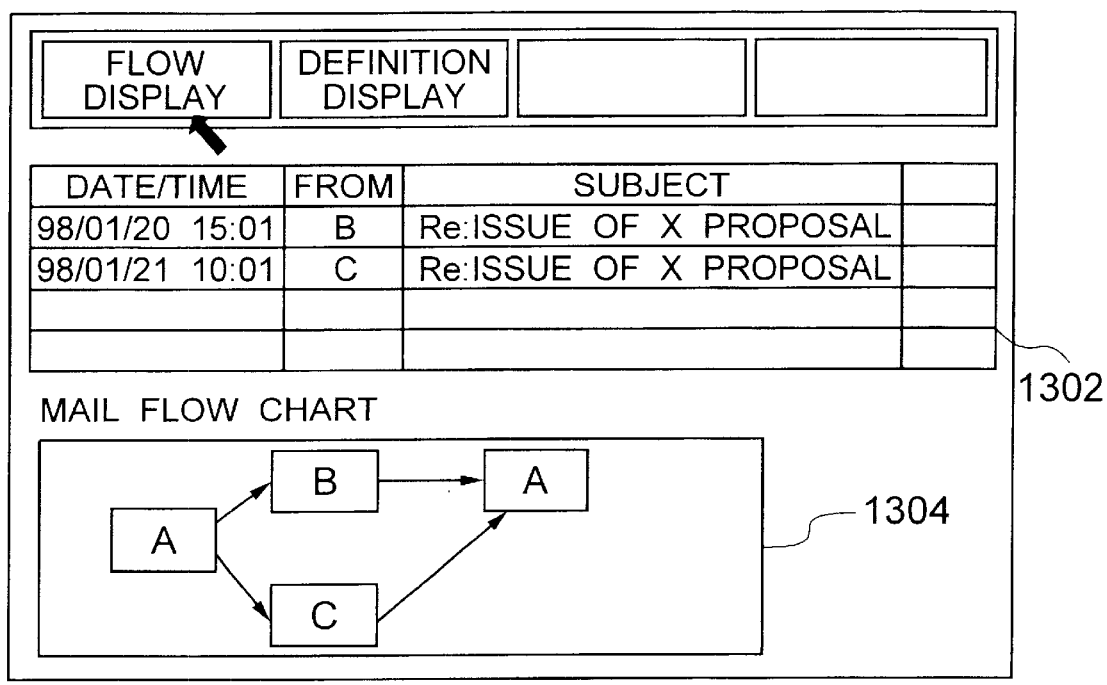
FIG. 13 is a diagram showing an example of a mail flow display according to the invention.

The mail flow shown in FIG. 13 is extracted from the mail transmission audit data storage unit 110 shown in FIG. 1. As shown in FIG. 13, the mail flow has a condition list (mail list) 1302 shown in the upper half area and a mail flow chart 1304 shown in the lower half area. The mail list 1302 includes date/time, mail sender activity, a subject and the like, and the mail flow chart 1304 shows the order of mail transmissions. In this example shown in FIG. 13, after an instance is transmitted from user A to users B and C, the users B and C return it to the user A.

Figure 14A:
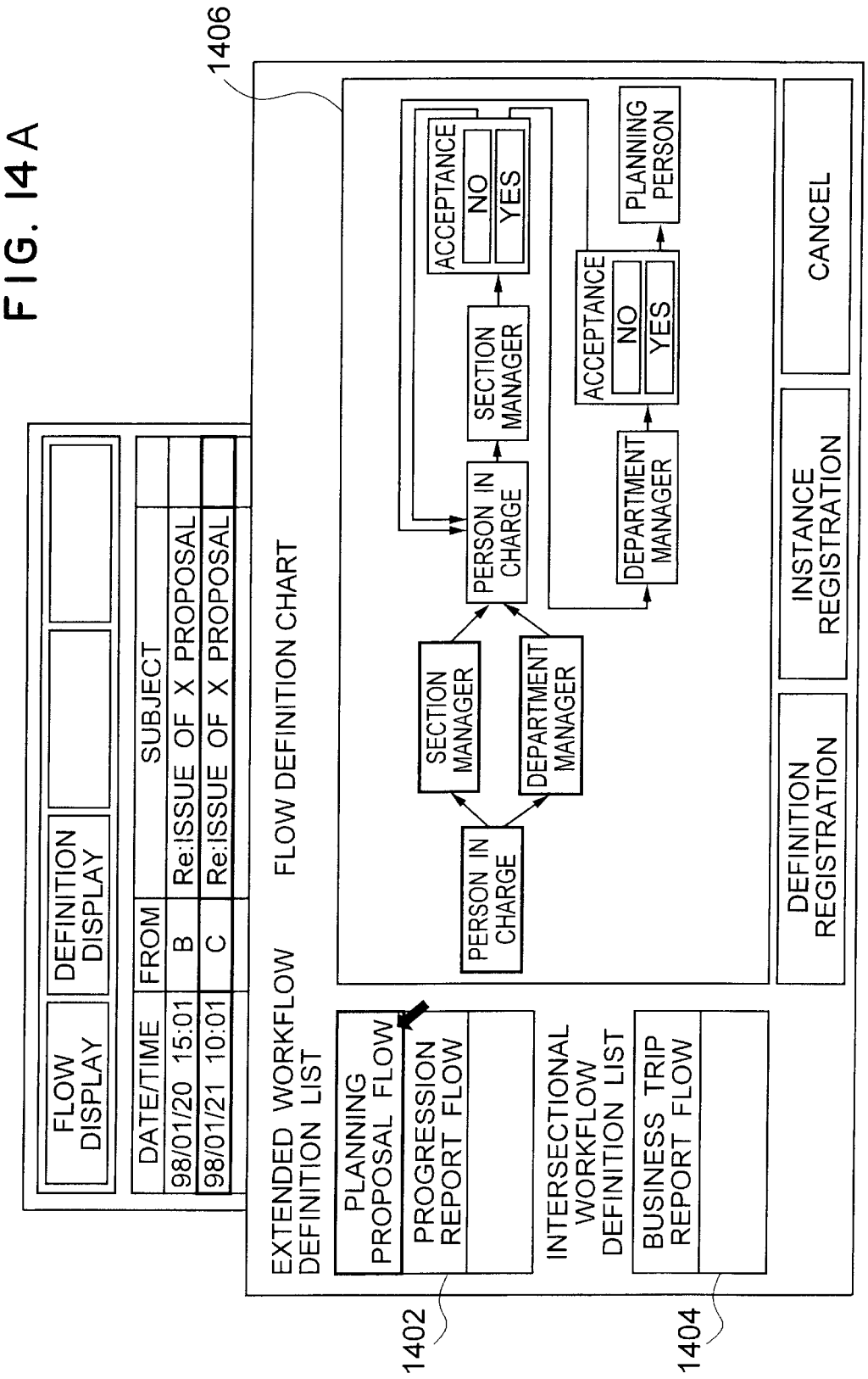
FIG. 14A is a diagram showing an example of a work flow definition display obtained through extension of a mail flow according to the invention.

FIG. 14A shows an extended workflow definition list obtained through extension of the mail flow upon clicking the flow display shown in FIG. 13, and FIG. 14B shows an intersectional workflow definition list obtained through extraction of the mail flow upon clicking the flow display shown in FIG. 13. In the example shown in FIG. 14A, an extended workflow definition chart covering the whole work from the person in charge to the planning person is displayed upon clicking a planning proposal flow in an extended workflow definition area 1402. In the example shown in FIG. 14B, only a portion wherein an instance is passed from a person in charge to a section manager and a department manager and a presence/absence of a comment on a business trip report is returned to the person in charge, is extracted from the whole flow, upon clicking a business report flow in an intersectional workflow definition area 1404.

Referring to FIG. 7, the user interface processing part 102 displays the mail list 1302 shown in FIG. 13 (Step 702) and waits for an input of a mail or a user operation (Step 704). Upon a user operation is input, it is checked whether a mail flow of a selected mail is already extracted and whether the user operation is a mail flow extraction operation or a comparison operation (Step 706). If the user operation is the mail flow extraction operation or the mail flow is not still extracted, the flow stands by until it is confirmed that a user operation for the extraction is entered (Step 712) and thereafter the mail flow extraction part 118 extracts the mail flow (Step 714) to display a mail flow chart 1304 (FIG. 13) (Step 716).

If the judgement at Step 706 indicates that the operation is a definition comparison operation and if the mail flow is already extracted, a user confirmation input is waited (Step 718), and the flow definition comparison part 120 performs a comparison process between the mail flow and workflow definitions (Step 720).

With this process, as shown in FIGS. 14A and 14B, a list of definitions having the matched flows is displayed as the extended workflow definition list 1402 and intersectional workflow definition list 1404 (Step 722) to wait for an operation input (Step 708).

After a registration operation input or a user operation input is waited for (Step 708), if the user selects a flow in the definition list, the selected workflow definition is displayed as a flow definition chart 1406 (FIG. 14), whereas the registration operation is entered, it is checked whether the registration operation is a definition registration operation or an instance registration operation (Step 710). In the case of the definition registration operation, the definition registration part 122 registers workflow definitions (Step 724). In the case of the instance registration operation, the instance registration part 124 registers a workflow instance (Step 726). If the operation input is neither the definition registration or the instance registration, the flow waits for a mail/operation selection input (Step 704).

Next, with reference to FIGS. 8 and 9, the detailed operation of the mail flow extraction part 714 will be described.

Figure 8:
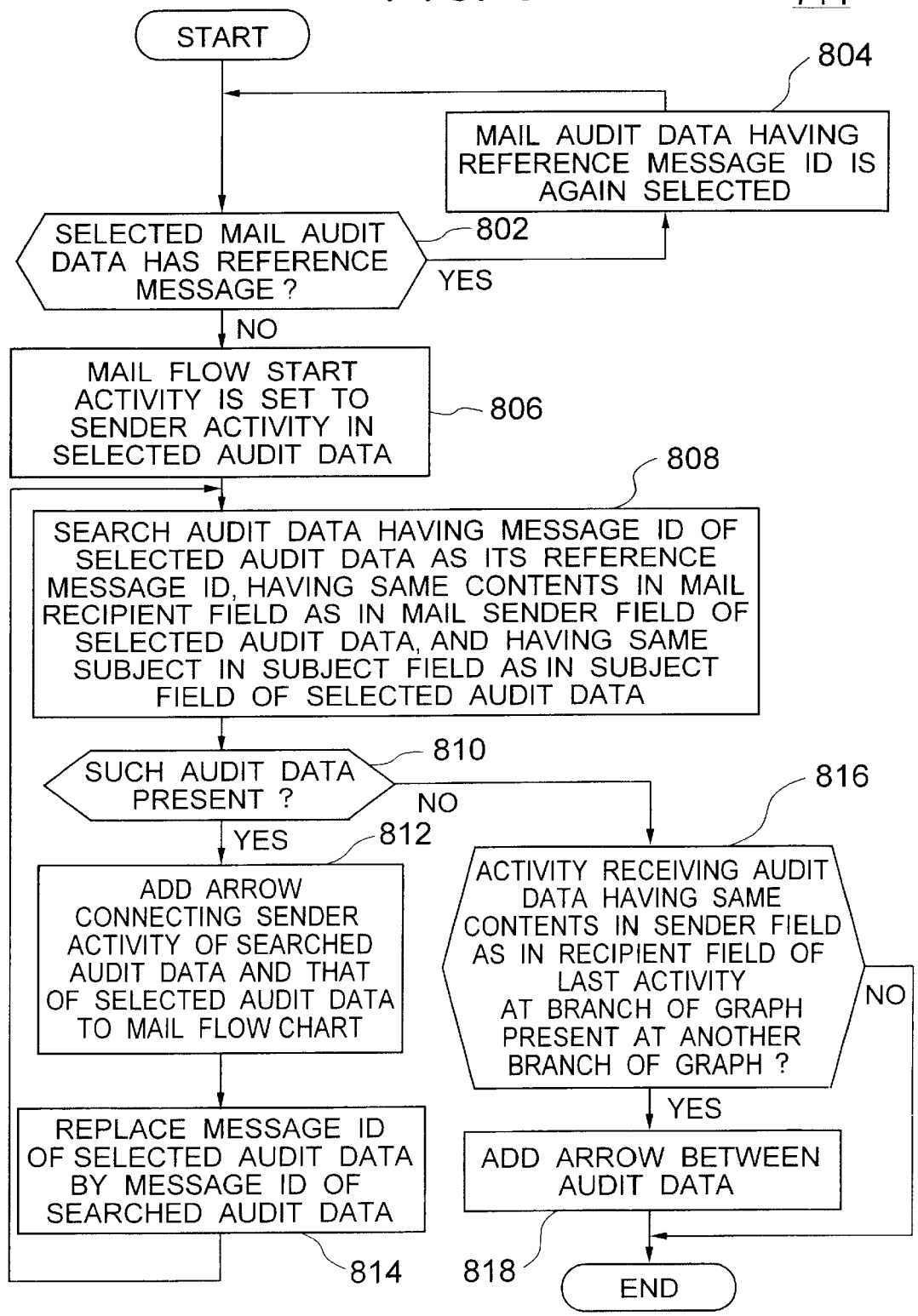
FIG. 8 is a flow chart illustrating an operation of a mail flow extracting part shown in FIG. 1.
Figure 9:
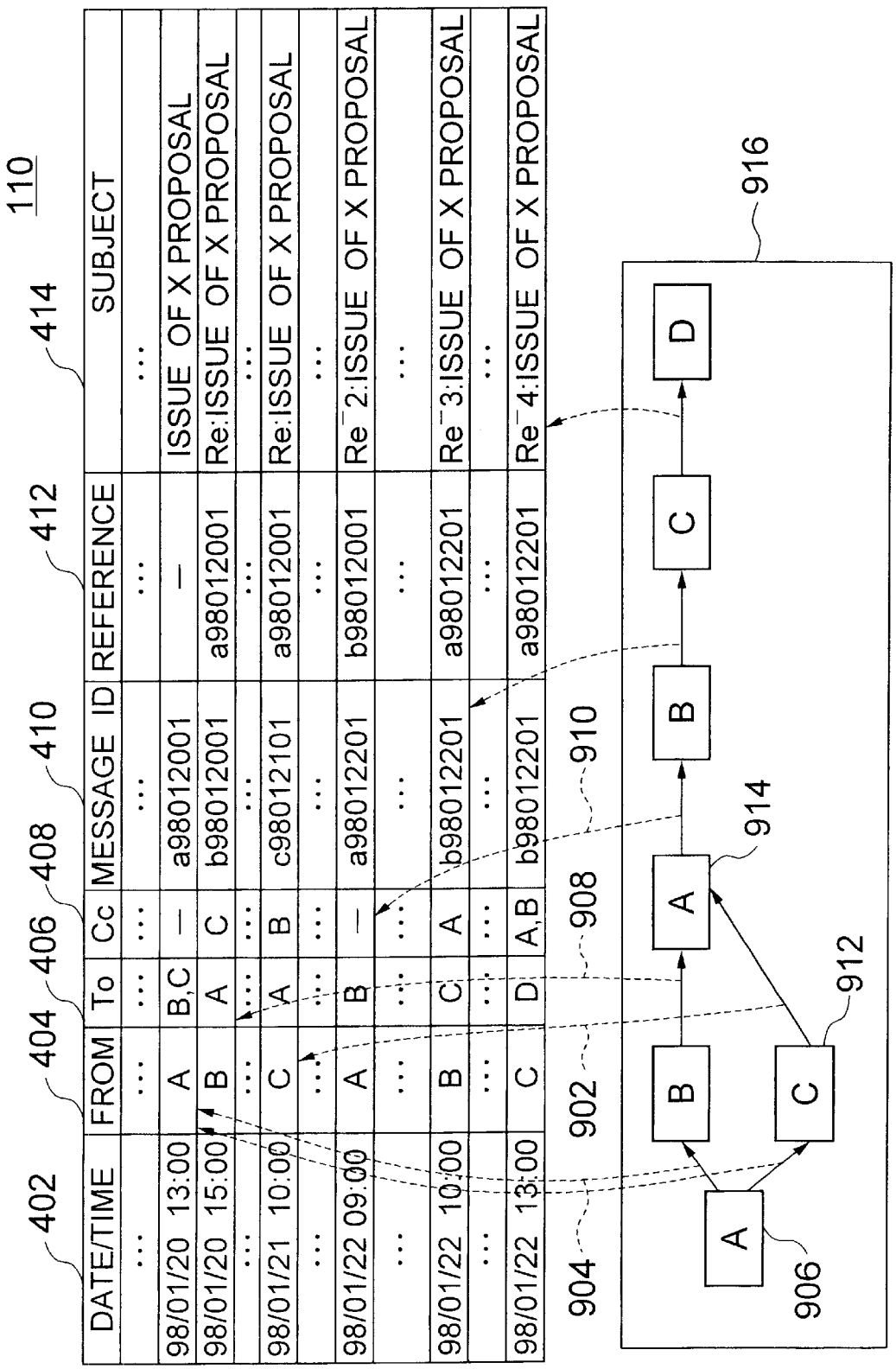
FIG. 9 is a diagram showing an example of a mail flow corresponding to audit data of sent mails according to the invention.

FIG. 8 is a flow chart illustrating an operation of extracting a mail flow from the mail transmission audit data storage unit 110 shown in FIG. 1. FIG. 9 is a diagram illustrating how a mail flow stored in the storage unit 110 is extracted.

First, it is checked from the mail transmission audit data storage unit 110 whether the selected mail has a reference message (Step 802). As shown in FIG. 9, the reference message is identified by the reference message ID in the reference message ID field 412 in the mail transmission audit data storage unit 110 which stores mail transmission audit data in the order of transmission. If there is audit data of the reference message, a mail corresponding to the audit data is selected (Step 804) and it is checked again whether the selected mail has the reference message (Step 802). If there is no audit data of the reference message, the mail sender activity in the audit data of the selected mail is used as a start activity of the mail flow (Step 806). The mail sender activity is the activity described in the recipient field 404 of the mail transmission audit data storage unit 110.

The reason why the reference message is again checked at Step 802 after the audit data is once selected at Step 804, is to search the first written mail by checking links of reference messages. Namely, by sequentially searching reference messages, a mail having no reference message can be found which is the first written mail.

The above operations will be described specifically with reference to FIG. 9. A mail flow shown in a lower area in FIG. 9 is extracted from the mail transmission audit data shown in a higher area in FIG. 9. If a selected mail has a reference message, a mail corresponding to the reference message is selected, whereas if a selected mail has no reference message, the mail sender activity in the selected audit data is used as a mail flow start activity. Mails having the message ID of the start activity as the reference message IDes are searched. If there is such audit data, an arrow is added between the mail sender activity of the first selected audit data and the mail sender activity of the next searched audit data to draw a mail flow. In the example shown in FIG. 9, assuming that audit data 902 having the message ID of c98012101 of the activity C is first selected, audit data 904 having a message ID a98012001 as the reference message ID of the activity C is selected. In this case, since the audit data 904 has no reference message, the activity A (906) which is the mail sender activity of the audit data 904 is used as the flow start activity.

Reverting to FIG. 8, audit data having the message ID of the selected audit data as its reference message ID is searched from the mail transmission audit data storage unit 110 (Step 808) to judge whether there is any such audit data (Step 810). If there is such audit data, the sender activity of the searched audit data and an arrow connecting the sender activity of the searched audit data and the sender activity of the selected audit data are added to the mail flow chart (Step 812). The selected audit data is replaced by the searched audit data (Step 814) to thereafter return to Step 808 whereat the above operations are repeated.

The above operations will be described with reference to FIG. 9. As the audit data having the message ID of a98012001 of the mail audit data 904 of the sender activity A, there are two sets of audit data 908 and 902 having the message IDes b98012001 and c98012101 respectively of the sender activities B and C. Therefore, arrows between A and B and between A and C are added. Since audit data 910 has the message ID of the audit data 908 as its reference message ID, an arrow is added between the activities B and A from B to A. Similarly, activities B, C and D and arrows between A and B, between B and C and between C and D are added.

If at Step 810 shown in FIG. 8 there is no audit data having the message ID of the selected audit data as its reference message ID, mail audit data including the same mail sender activity as the mail recipient activity of the first selected audit data and having a later date/time is searched from another branch of the graph (step 816). If there is such audit data, an arrow is added between the sender activity of the first selected audit data and the sender activity of the searched sender audit data, whereas if there is no such audit data, the process is terminated.

The above operations will be described with reference to FIG. 9. Since there is no mail audit data having as its reference message the audit data 902 of the sender activity C, audit data including the recipient activity A of the audit data 902 and having a later date/time is searched. The sender activity or audit data 910 is such audit data, so that an arrow is added between the sender activity C (912) of the audit data 902 and the sender activity A (914) of the audit data 910. With the above operations, a mail flow 916 shown in FIG. 9 can be generated.

Next, the detailed operation to be executed by the workflow definition comparison part 120 will be described with reference to FIGS. 10 and 14.

Figure 10:
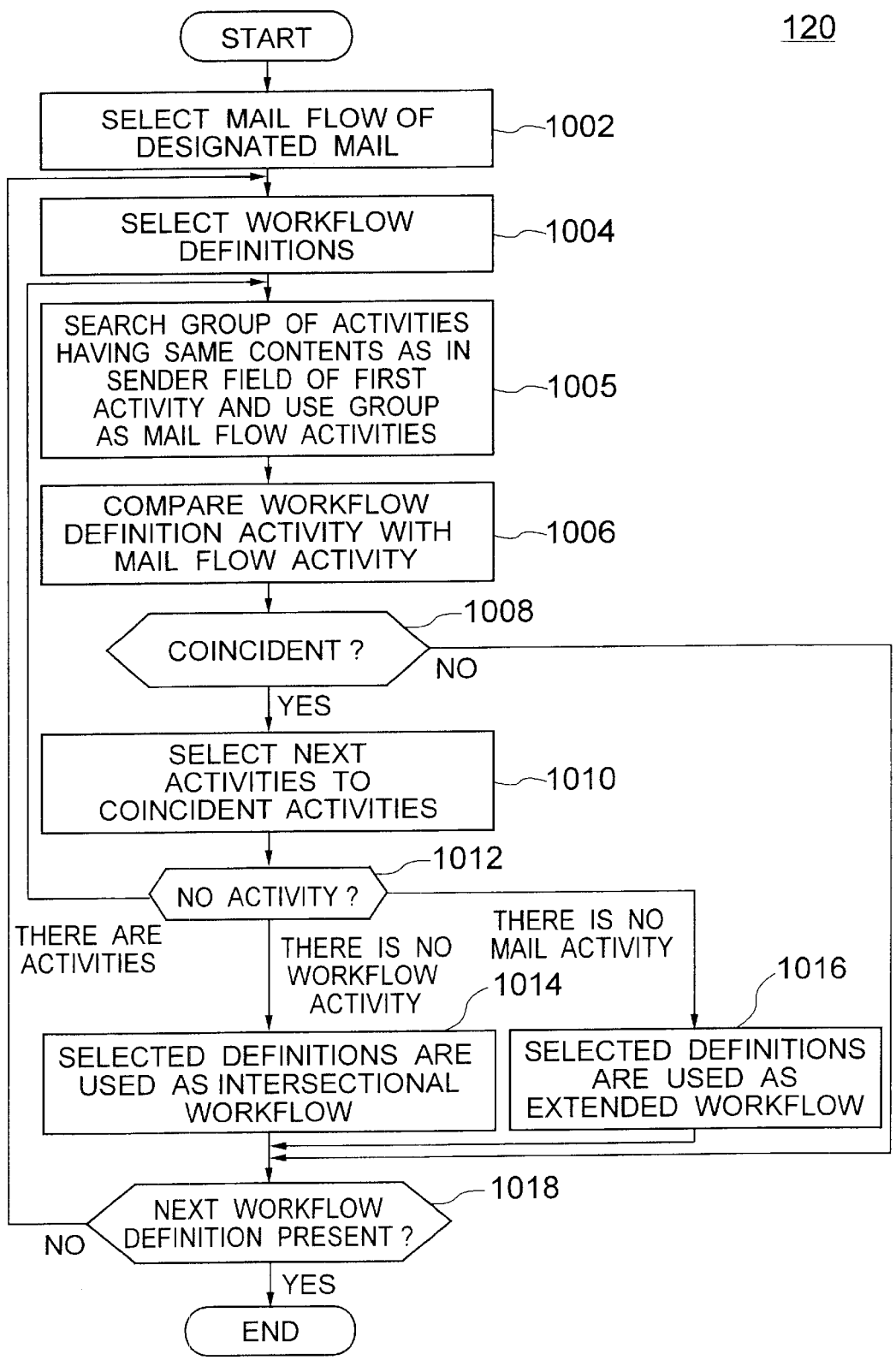
FIG. 10 is a flow chart illustrating a matching process to be executed by a workflow definition comparison part shown in FIG. 1.

FIG. 10 is a flow chart illustrating the operation of the workflow definition comparison part 120 shown in FIG. 1. FIGS. 14A and 14B show examples of workflow definitions obtained through extension or extraction of the mail flow.

First, a mail flow of a designated mail is selected to show the mail flow such as shown in FIG. 13 (Step 1002). The workflow definitions are selected as shown in FIG. 14A or 14B (Step 1004). Next, the start activity of the mail flow is selected to select a group of activities having the same contents as in the sender field of the start activity, and the contents of the selected first activity are replaced by the selected group name (Step 1005). For example, "A" of the mail flow chart shown in FIG. 13 is replaced by "person in charge". Next, the start activity of the replaced mail flow chart is compared with the start activity of the workflow definition chart (Step 1006) to check whether they are coincident (Step S1008). For example, the start activity of the mail flow chart shown in FIG. 13 is compared with the start activity of the workflow definition chart shown in FIG. 14A or 14B. If not coincident and there is the next definition, the flow returns to Step 1004 (Step 1018) to compare the next definition in a manner similar to the above operation. If coincident, the next activities are selected (Step 1010) to repeat the comparison starting at Step 1005 until it becomes that there is no next activity of either mail flow activity or workflow activity. If there is no next activity, it is judged which of the mail flow activity and workflow activity becomes absent (Step 1012). If the workflow activity becomes absent first, the selected definitions are used as the intersectional workflow (Step 1014), whereas if the mail flow activity becomes absent first, the selected definitions are used as the extended workflow (Step 1016) to thereafter advance to Step 1018.

FIG. 14A shows an example of the extended workflow, and FIG. 14B shows an example of the intersectional workflow. As compared to the extracted mail flow pattern 1304 shown in FIG. 13, the extended workflow includes the extracted mail flow pattern whereas the intersectional workflow is included in the extracted mail flow pattern.

Next, the operation of the workflow definition registration part 122 will be described.

FIG. 11 is a flow chart illustrating the operation of the workflow definition registration part 122 shown in FIG. 1.

First, it is checked whether the workflow definition chart selected at Step 708 shown in FIG. 7 is an extended workflow or an intersectional workflow (Step 1102). If the workflow definition chart is the intersectional workflow, the intersectional workflow definitions are compared with the mail flow definitions generated at Step 714 shown in FIG. 7 to thereby add definitions not contained in the intersectional workflow definitions but contained in the mail flow (Step 1104). If the workflow definition chart is the extended workflow chart, the extended workflow definitions are compared with the mail flow definitions to thereby delete definitions contained in the extended workflow and not contained in the mail flow (Step 1106). The newly formed definitions are registered in the workflow definition storage unit 112 (Step 1108).

Figure 12:
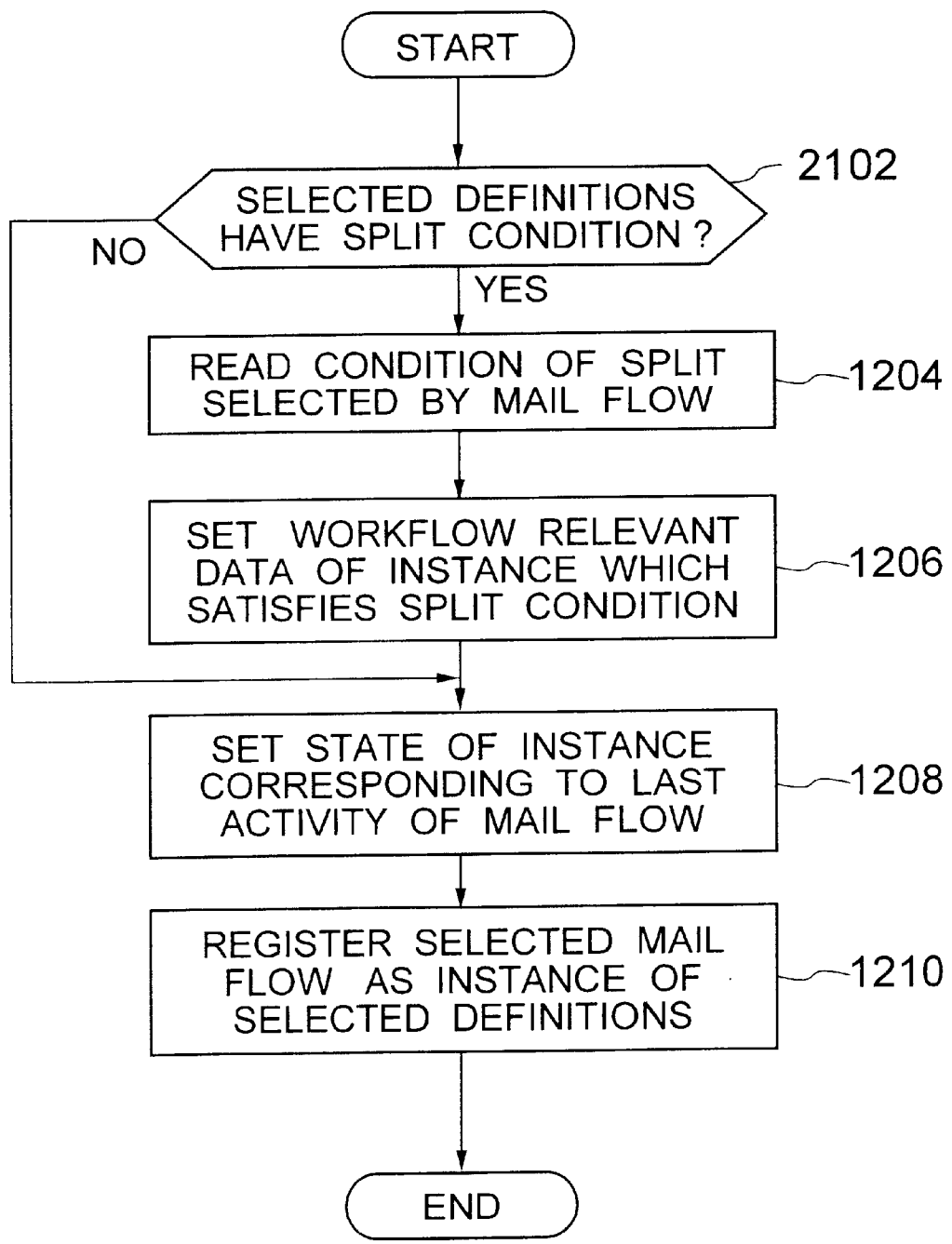
FIG. 12 is a flow chart illustrating a process of a workflow instance registration part shown in FIG. 1.

Next, the operation of the workflow instance registration part 124 will be described with reference to FIG. 12. FIG. 12 is a flow chart illustrating the operation of the workflow instance registration part 124 shown in FIG. 1.

First, it is checked whether the workflow definitions selected at Step S708 shown in FIG. 7 have a split condition (Step 1202). If not, the flow advances to Step 1208, whereas if they have a split condition, the condition of the split selected by the mail flow is read (Step 1204) to set workflow relevant data of an instance which satisfies the split condition (Step 1206). Thereafter, the state of the instance corresponding to the last activity of the mail flow and the a definition ID of the selected workflow definitions are set (Step 1208). A unique instance ID is set and the selected mail flow is registered in the workflow instance storage unit 114 as the instance of the selected definitions (Step 1210).

As described above, according to this embodiment, circulation is not required to start from the workflow system, but it can be first started from the mail system and then a workflow instance can be easily entered. It is therefore possible to distribute a load on the workflow system to the mail system. Since the workflow definitions can be easily formed by using audit data of mail circulation, the number of work processes for forming workflow definitions can be reduced. When workflow definitions and instances are generated from the mail flow by referring to already formed workflow definitions, mail flow definitions and workflow definitions are compared on a display screen. It is therefore easy to determine the workflow definitions.

In the above embodiment, a combination of the mail system and workflow system is used. The invention is also applicable to only a workflow system. In the following, a second embodiment applying the invention only to a workflow system will be described.

(2nd Embodiment)

Figure 2:
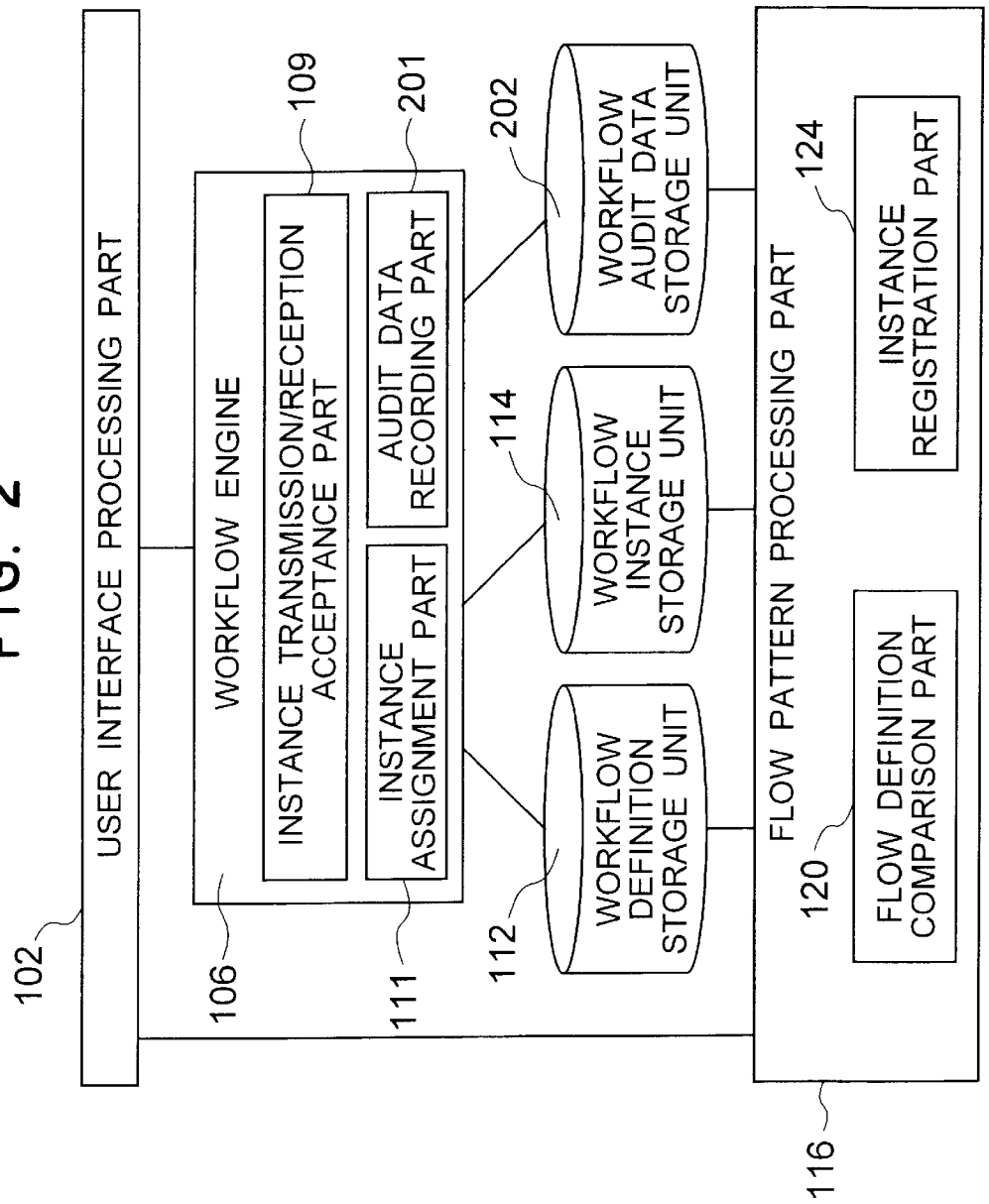
FIG. 2 is a functional block diagram illustrating a workflow management method according to a second embodiment of the invention.

FIG. 2 is a functional block diagram illustrating a workflow management method according to the second embodiment of the invention.

The configuration of the second embodiment is simplified more than that shown in FIG. 1. This system is constituted of a user interface processing part 102, a workflow engine 106, a workflow definition storage unit 112, a workflow instance storage unit 114, a workflow audit data storage unit 202, and a flow pattern processing part 116 made of a flow definition comparison part 120 and an instance registration part 124. The user interface processing part 102, workflow engine 106 and flow pattern processing part 116 other than the storage units 112, 114 and 202 are made of software.

The user interface processing part 102 calls an instance transmission/reception acceptance part 109 of the workflow engine 106 via a connection link. If a call is an instance transmission (transition) request, the instance transmission/reception acceptance part 109 calls an instance assignment part 111. The instance assignment part 111 acquires workflow definitions corresponding to an instance to be transmitted, from the workflow definition storage unit 112, determines a next assignment user to which the instance is delivered, in accordance with the workflow definition, and updates the workflow instance storage unit 114 so that the instance becomes an object to be processed by the next assignment user. If a call is an instance reception request, the instance transmission/reception acceptance part 109 acquires an instance corresponding to the called user from the workflow instance storage unit 114 and outputs it to the user interface processing part 102.

Data stored in the workflow audit data storage unit 202 is similar to that stored in the mail transmission audit data storage unit 110 shown in FIG. 1. However, the reference message ID and message ID are replaced by an instance ID.

In this embodiment, it is possible to register an already entered and circulated workflow as an instance of other similar workflow definitions. Therefore, even an instance whose processes are not still determined to the last process, can be processed as a workflow instance. Furthermore, since the composition relationship of workflow definitions can be obtained, management of workflow definitions is easy.

In the system shown in FIG. 2, a workflow instance is processed and workflow definitions corresponding to the instance are already present. Therefore, it is not necessary as in the case of mail analysis in the system shown in FIG. 1 to extract workflow definitions and register them.

As described so far, the invention has the following advantages: (1) Circulation is not required to start from the workflow system, but it can be first started from the mail system and then a workflow instance can be easily entered. It is therefore possible to distribute a load on the workflow system to the mail system. (2) Since the workflow definitions can be easily formed by using audit data of mail circulation, the number of work processes for forming workflow definitions can be reduced. (3) When workflow definitions and instances are generated from the mail flow by referring to already formed workflow definitions, mail flow definitions and workflow definitions are compared on a display screen. It is therefore easy to determine the workflow definitions. (4) It is possible to register an already entered and circulated workflow as an instance of other similar workflow definitions. Therefore, even an instance whose processes are not still determined to the last process, can be processed as a workflow instance. (5) Furthermore, since the composition relationship of workflow definitions can be obtained, management of workflow definitions is easy.

What is claimed is:

1. A workflow management method for managing mail transmission/reception and a flow of works in accordance with workflow definition information for defining a flow of works, the method comprising the steps of:

a) storing mail transmission audit data;

b) comparing pattern information of a mail flow derived from the mail transmission audit data with preloaded workflow definition information, to obtain an extended workflow or an intersectional workflow of the mail flow; and c) registering the mail flow pattern information including the extended workflow or the intersectional workflow in the workflow definition information as new workflow definition information.

2. A workflow management method for managing mail transmission/reception and a flow of works in accordance with workflow definition information for defining a flow of works, the method comprising the steps of:

a) storing mail transmission audit data;

b) comparing pattern information of a mail flow derived from the mail transmission audit data with preloaded workflow definition information, to obtain an extended workflow or an intersectional workflow of the mail flow;

c) registering the mail flow pattern information including the extended workflow or the intersectional workflow in the workflow definition information as new workflow definition information; and wherein said step c) comprises the subsidiary steps of:
  c1) displaying a mail flow selected from the mail transmission audit data;
  c2) displaying intersectional workflow definitions or extended workflow definitions in predefined workflow definitions matching the mail flow; and
  c3) registering the mail flow as new flow definitions based upon the flow definition selected from the displayed flow definitions.

3. A workflow management method for managing mail transmission/reception and a flow of works in accordance with workflow definition information for defining a flow of works, the method comprising the steps of:
  a) storing mail transmission audit data;
  b) comparing pattern information of a mail flow derived from the mail transmission audit data with preloaded workflow definition information, to obtain an extended workflow or an intersectional workflow of the mail flow;
  c) registering the mail flow pattern information including the extended workflow or the intersectional workflow in the workflow definition information as new workflow definition information; and
  wherein said step b) comprises the subsidiary steps of:
    b1) judging whether there is a reference message which refers to a selected mail, when the mail flow is derived from the mail transmission audit data;
    b2) if there is audit data having the reference message, selecting a mail corresponding to the history;
    b3) if there is no audit data having the reference message, setting a sender activity of the audit data of the selected mail as a start activity of the mail flow to be derived;
    b4) searching audit data containing a message identifier of the selected audit data as an identifier of the reference message, from the mail transmission audit data;
    b5) if there is such audit data, adding an arrow between the sender activity of the selected audit data and the sender activity of the searched audit data;
    b6) replacing the selected audit data by the searched audit data and repeating said steps b4) and b5);
    b7) if there is no audit data containing a message identifier of the selected audit data as an identifier of the reference message, searching from another graph branch mail audit data having a sender activity same as the sender activity of the selected audit data and a later date and time; and
    b8) if a search result indicates that there is such audit data, adding an arrow between the sender activity of the selected audit data and the sender activity of the searched audit data.

4. A workflow management method for managing mail transmission/reception and a flow of works in accordance with workflow definition information for defining a flow of works, the method comprising the steps of:
  a) storing mail transmission audit data;
  b) comparing pattern information of a mail flow derived from the mail transmission audit data with preloaded workflow definition information, to obtain an extended workflow or an intersectional workflow of the mail flow;
  c) registering the mail flow pattern information including the extended workflow or the intersectional workflow in the workflow definition information as new workflow definition information; and
  wherein said step c) comprises the subsidiary steps of:
    c1) judging whether the workflow definition information selected from storage means is an extended workflow or an intersectional workflow;
    c2) if the intersectional workflow, comparing the intersectional workflow definitions with the mail flow derived from the stored mail transmission audit data, and generating flow definitions by adding definitions not present in the mail flow from the intersectional workflow definitions;
    c3) if the extended workflow, comparing extended workflow definitions with the mail flow derived from the stored mail transmission audit data, and generating flow definitions by deleting definitions not present in the mail flow from the extended workflow definitions; and
    c4) registering the flow definitions generated at said step c2) or c3) as new workflow definitions.

5. A storage medium storing a program for a processing apparatus to execute a workflow management method for managing mail transmission/reception and a flow of works in accordance with workflow definition information for defining a flow of works, the method comprising the steps of:
  a) storing mail transmission audit data;
  b) comparing pattern information of a mail flow derived from the mail transmission audit data with preloaded workflow definition information, to obtain an extended workflow or an intersectional workflow of the mail flow; and
  c) registering the mail flow pattern information including the extended workflow or the intersectional workflow in the workflow definition information as new workflow definition information.

6. A workflow management system for managing mail transmission/reception and a flow of works in accordance with workflow definition information for defining a flow of works, comprising:
  a) means for storing mail transmission audit data;
  b) means for comparing pattern information of a mail flow derived from the mail transmission audit data with preloaded workflow definition information, to obtain an extended workflow or an intersectional workflow of the mail flow; and
  c) means for registering the mail flow pattern information including the extended workflow or the intersectional workflow in the workflow definition information as new workflow definition information.

7. A workflow management method for managing mail transmission/reception and a flow of works in accordance with workflow definition information for defining a flow of works, the method comprising the steps of:
  displaying a mail flow of a selected mail;
  deriving at least one of intersectional workflow definitions and extended workflow definitions matching the mail flow, of predefined workflow definitions, and displaying the derived flow definitions;
  selecting one of the displayed flow definitions; and
  registering the mail flow as flow definitions based upon the selected flow definition.

* * * * *